No. 878,204. PATENTED FEB. 4, 1908.
G. M. D. HEARD.
RATCHET BRACE.
APPLICATION FILED JAN. 14, 1907.
2 SHEETS—SHEET 2.
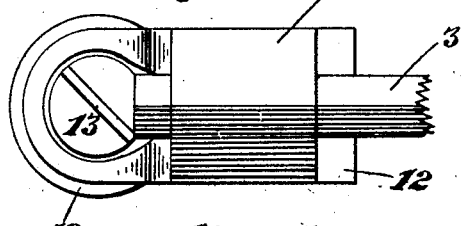
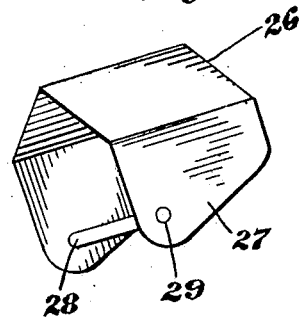
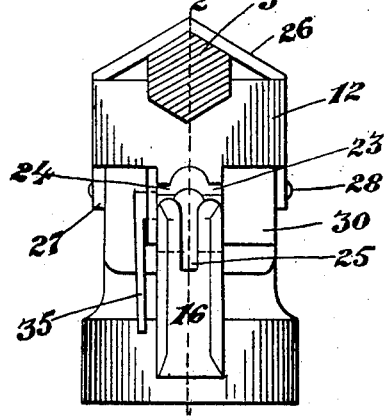
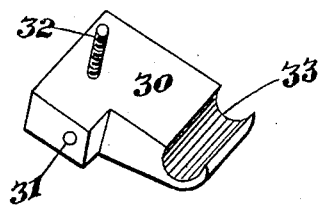
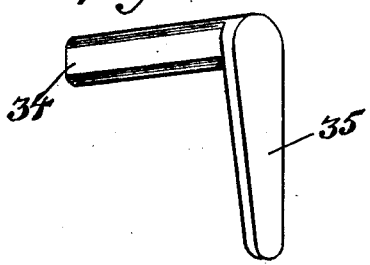
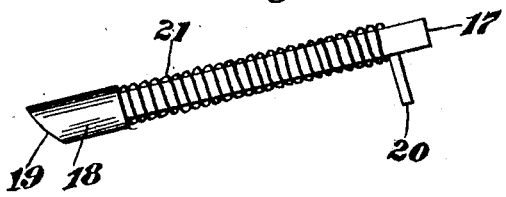
Witnesses:
Chas. A. Becker,
Elliott R. Goldsmith.
Inventor:
George M. D. Heard,
By Hugh K. Wagner,
His Attorney.

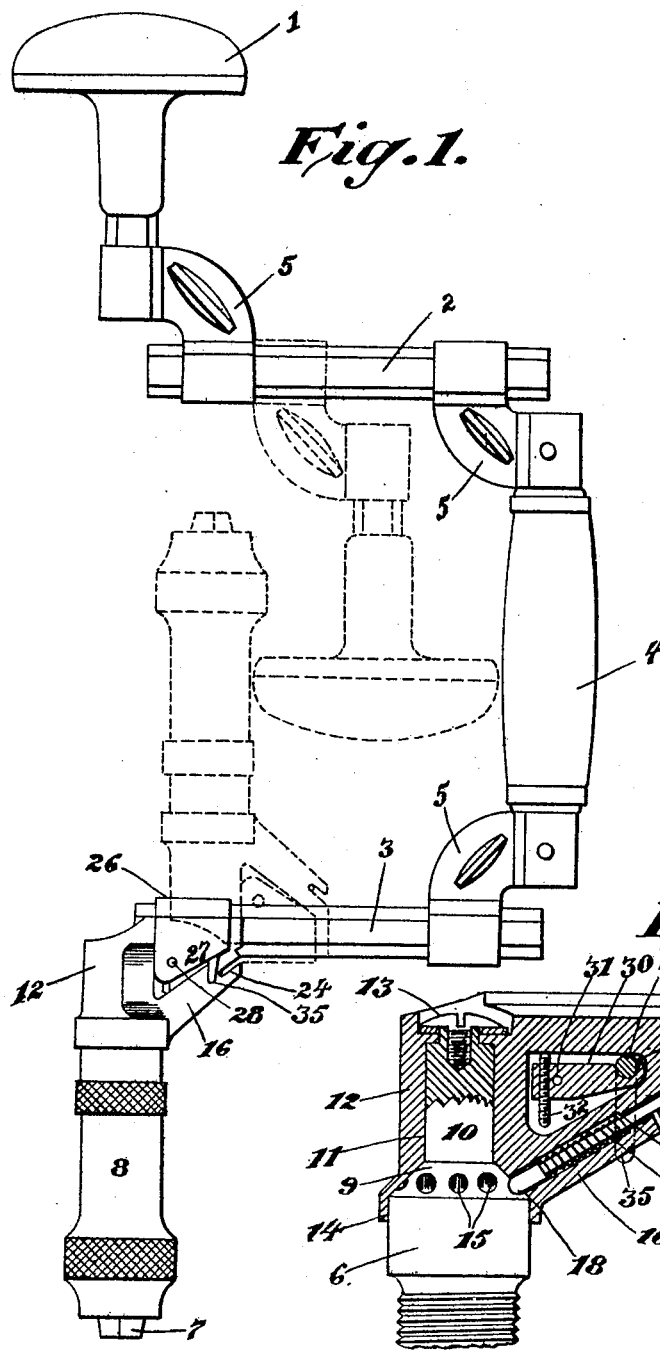

UNITED STATES PATENT OFFICE.

GEORGE M. D. HEARD, OF PAINESVILLE, OHIO.

RATCHET-BRACE.

No. 878,204.  Specification of Letters Patent.  Patented Feb. 4, 1908.

Application filed January 14, 1907. Serial No. 352,097.

*To all whom it may concern:*

Be it known that I, GEORGE M. D. HEARD, a citizen of the United States, residing at the city of Painesville, in the county of Lake and State of Ohio, have invented certain new and useful Improvements in Ratchet-Braces, of which the following is a specification, reference being had therein to the accompanying drawings.

This invention relates to ratchet braces, particularly to an improved form of ratchet head adapted for use in connection with the brace illustrated in my prior United States patents No. 779,079, issued January 3, 1905, and No. 810,409, issued January 23, 1906.

In the drawings forming part of this specification, in which like numbers of reference denote like parts wherever they occur, Figure 1 is a side elevation of a brace embodying my invention; Fig. 2 is a sectional view on the line 2—2, Fig. 4, the chuck being shown partly in elevation and partly in section; Fig. 3 is a top plan view of the stock and clamp; Fig. 4 is a rear elevation of the stock, the sweep-arm being shown in section; Figs. 5, 6, and 7 are details of the clamping mechanism; and Fig. 8 is a detail of the ratchet plunger.

The top 1, sweep-arms 2 and 3, handle 4, and elbows 5 which connect same together are all constructed and arranged as described in the first of my aforementioned Letters-Patent.

In the hollowed-out part (not shown) of the externally-threaded chuck 6, jaws 7 are normally retained, a revoluble adjusting-drum 8 being screwed upon the chuck to keep said jaws in place. Above head 9 of chuck 6 is a shank 10 which is journaled in a perforation 11 provided therefor in stock 12, the top of shank 10 being tapped, so that screw 13 may be driven therein, said screw, in conjunction with the usual annular washer, thus serving to keep the chuck in its proper position in the stock. Formed integral with the stock 12 is a collar 14 which encircles the head 9 below shank 10, so that chuck 6 may rotate within the stock 12, perforation 11 and collar 14 serving as suitable bearings in which said chuck is journaled.

In the head 9 of chuck 6 sockets 15 are drilled, said sockets extending inwardly at right angles to the upper surface of said head, which surface is beveled and disposed at an oblique angle to the axis of the chuck. Upon the stock 12 a hollow offset 16 is formed, said offset extending outwardly at an oblique angle to the axis of the chuck, and having the center line of the hollowed-out part at right angles to the beveled face of head 9. Within this hollow offset a spring-controlled plunger is carried, said plunger being provided to lock the stock and chuck together. Said plunger comprises a stem 17 having, at one end, a head 18 which has the beveled face 19, and, at the other end, a pin 20, while a helical spring 21, encircling the plunger stem and having one end bearing against head 18 and the other against a shoulder 22 on the inner wall of offset 16, keeps said plunger normally pressed toward chuck 6, so that head 18 seats in one of the sockets 15. The plunger can be withdrawn from said sockets by pulling it out by means of pin 20, against the pressure of said spring 21, and, in addition, it will withdraw automatically when the device is turned so that the beveled edge 19 rides upon the walls of sockets 15. The plunger, obviously, is presented toward the chuck at an oblique angle to the axis thereof, and thus engages the chuck more firmly than would be possible if it were otherwise placed.

In the outer end of offset 16 are three slots 23, 24, and 25, and in one or the other of these slots pin 20 seats when head 18 is inserted in a socket 15. When pin 20 seats in slot 23, the beveled face 19 is turned toward the right, Fig. 4, so that when the stock is rotated clockwise the plunger remains seated in socket 15 and locks the stock to the chuck, thus causing said members to rotate in unison. When, however, the stock is rotated counter-clockwise, the beveled face of plunger-head 18 will ride upon the edges of the sockets 15, thereby lifting the plunger out of said sockets, and the stock will thus rotate independently of the chuck. When the pin 20 seats in slot 24, the beveled face of head 18 faces toward the left, Fig. 4, so that stock and chuck move in unison when the stock is rotated counter-clockwise, but said members move independently of each other when moved clockwise. When the pin seats in slot 25, the plunger-head 18 is inserted so deeply in one of the sockets 15, and the beveled face is so turned that said face 19 can not ride upon the wall of the socket, and in such case stock and chuck are locked together and rotate in unison at all times.

Slots 23 and 24 are not as deep as slot 25, and do not permit the pin 20 to travel far enough to allow the plunger-head 18 to project to any great extent within sockets 15, for if the plunger should be inserted too deeply in said sockets, the beveled face 19 would not easily ride out of the socket in which said head may have seated, thus detracting from the efficiency of the tool as a ratchet means. Slot 25 is cut deeply, however, so that plunger-head 19 can project as far as possible within socket 15 when pin 20 is seated in said slot, for in this position it is undesirable that head 18 should be permitted to work out of socket 15, but, on the contrary, it should stay firmly seated therein, so that stock and chuck may remain locked together.

A clamp 26 is provided to hold the stock 12 to the sweep-arm 3, said clamp looping over the sweep-arm and having the ears 27 extending downwardly over the sides of the stock. A rod 28 passes through perforations 29 in said clamp and, likewise, through a perforation 31 in block 30, which block is placed in the triangular opening formed by the horizontal and vertical parts of stock 12 and the oblique offset 16, said rod thus pivotally securing clamp 26 and block 30 together. At one end of said block 30 a screw 32 passes therethrough and bears against the under side of stock 12, while in the other end a semi-cylindrical recess 33 is cut, which recess carries a cam-member 34, a lever 35 being provided to rock said cam, said lever being placed where it is easily accessible to the operator's fingers. When cam 34 is thus rocked, the right-hand end, Fig. 2, of block 30 is depressed, swinging on rod 28 as a fulcrum, until screw 32 strikes stock 12. The continued movement of cam 34 then causes stock 12 to be pressed upwardly, and clamp 26 to be pulled downwardly, thus binding stock 12 securely to sweep-arm 3. When it is desired to shift the position of the stock on the sweep-arm, lever 35 is moved so that clamp 26 is loosened, the stock is moved to the desired position, where it is again locked in place by turning cam 34 so as to tighten clamp 26. The screw 32 serves to regulate the clamping pressure of the cam 34.

The operation of the brace is simple, and may be summarized as follows: The proper bit having been clamped in the jaws, lever 35 is turned so as to fix the stock in proper position upon sweep-arm 3. If the operator desires to have the bit rotate, no matter in which direction the handle is swung, plunger 17 is so adjusted that pin 20 seats in slot 25, thus allowing the head 18 to project into socket 15 so deeply and with its beveled face 19 so turned that the plunger can not ride out of the socket, thereby keeping stock and chuck locked together at all times. When the operator desires to use the device as a ratchet brace, so that the handle can move in one direction in unison with the bit, and in the other direction independently thereof, plunger 17 is turned so that pin 20 seats in slot 23 or 24, according to the direction in which movement in unison is desired.

Having thus described my said invention, what I claim and desire to secure by Letters-Patent is:

1. In a ratchet brace, the combination of a chuck, cylindrical sockets in the heads thereof, a stock, or bracket, an offset from said stock, or bracket, slots in said offset, the middle slot being deeper than the outer slots, a cylindrically-shaped beveled-headed plunger carried in said offset, and a pin upon said plunger, said pin seating in said slots, said plunger sinking deeply into said sockets when said pin is in said middle socket, but only slightly when said pin is in said outer sockets.

2. A ratchet brace having a bracket comprising three members, the sweep-arm engaging one of said members, the chuck passing through another of said members, a cylindrically-shaped beveled-headed plunger passing through the third member, said plunger being adapted to seat in cylindrical sockets on said chuck, said first-mentioned and said second-mentioned members being approximately at right-angles to each other and said third-mentioned member connecting the extremities of said other-mentioned members, and means for clamping the sweep-arm to the bracket, said means being disposed in the space between said three members.

In testimony whereof I have affixed my signature in presence of two witnesses.

GEORGE M. D. HEARD.

Witnesses:
   Geo. H. Shepherd,
   B. C. Shepherd.